(12) United States Patent
Prabhakaran et al.

(10) Patent No.: US 8,407,403 B2
(45) Date of Patent: Mar. 26, 2013

(54) EXTENDING SSD LIFETIME USING HYBRID STORAGE

(75) Inventors: Vijayan Prabhakaran, Sunnyvale, CA (US); Mahesh Balakrishnan, Mountain View, CA (US); Gokul Soundararajan, Oakville (CA)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 12/631,875

(22) Filed: Dec. 7, 2009

(65) Prior Publication Data

US 2011/0138106 A1 Jun. 9, 2011

(51) Int. Cl.
*G06F 12/00* (2006.01)

(52) U.S. Cl. .............................. 711/103; 711/115

(58) Field of Classification Search .......... 711/103, 711/115; 365/185.33
See application file for complete search history.

(56) References Cited

U.S. PATENT DOCUMENTS

| | | | |
|---|---|---|---|
| 5,832,515 A | 11/1998 | Ledain et al. | |
| 5,999,446 A | 12/1999 | Harari et al. | |
| 6,000,006 A | 12/1999 | Bruce et al. | |
| 6,850,443 B2 | 2/2005 | Lofgren et al. | |
| 2004/0128470 A1* | 7/2004 | Hetzler et al. | 711/209 |
| 2006/0149902 A1* | 7/2006 | Yun et al. | 711/118 |
| 2008/0288714 A1 | 11/2008 | Salomon et al. | |
| 2009/0265506 A1 | 10/2009 | Yim | |
| 2010/0174853 A1* | 7/2010 | Lee et al. | 711/103 |
| 2010/0191897 A1* | 7/2010 | Zhang et al. | 711/103 |
| 2010/0211731 A1* | 8/2010 | Mittendorff et al. | 711/113 |
| 2010/0293337 A1* | 11/2010 | Murphy et al. | 711/136 |
| 2010/0306448 A1* | 12/2010 | Chen et al. | 711/103 |
| 2011/0066788 A1* | 3/2011 | Eleftheriou et al. | 711/103 |
| 2011/0093654 A1* | 4/2011 | Roberts et al. | 711/105 |

FOREIGN PATENT DOCUMENTS

| | | |
|---|---|---|
| WO | 9726600 A1 | 7/1997 |
| WO | 2009102425 A1 | 8/2009 |
| WO | 2009110304 A1 | 9/2009 |

OTHER PUBLICATIONS

Transmittal of the International Search Report by the Korean Intellectual Property Office for International Application No. PCT/US2010/059100, dated Aug. 11, 2011.

Narasimhan, Om, "Optimizing Systems to Use Flash Memory as a Hard Drive Replacement", Retrieved at <<http://wikis.sun.com/download/attachments/17957083/820-4689.pdf>>, Apr. 2008, pp. 24.

(Continued)

*Primary Examiner* — Hashem Farrokh
(74) *Attorney, Agent, or Firm* — Microsoft Corporation

(57) ABSTRACT

A hybrid storage device uses a write cache such as a hard disk drive, for example, to cache data to a solid state drive (SSD). Data is logged sequentially to the write cache and later migrated to the SSD. The SSD is a primary storage that stores data permanently. The write cache is a persistent durable cache that may store data of disk write operations temporarily in a log structured fashion. A migration policy may be used to determine how long to cache the data in the write cache before migrating the data to the SDD. The migration policy may be implemented using one or more migration triggers that cause the contents of the write cache to be flushed to the SSD. Migration triggers may include a timeout trigger, a read threshold trigger, and a migration size trigger, for example.

16 Claims, 6 Drawing Sheets

OTHER PUBLICATIONS

Nankivell, Josef, "Tweaks for Using Linux with Solid State Drives", Retrieved at <<http://www.brighthub.com/computing/linux/articles/9170.aspx>>, Sep. 29, 2008, pp. 1-3.

"NAND Evolution and its Effects on Solid State Drive (SSD) Useable Life", White Paper, Western Digital, WP-001-01R, Retrieved at <<http://www.wdc.com/WDProducts/SSD/whitepapers/en/NAND_Evolution_0812.pdf>>, 2009, pp. 16.

Kyrnin, Mark, "Hybrid Hard Drives", Retrieved at <<http://compreviews.about.com/od/storage/a/HybridHD.htm>>, About.com PC Hardware/Reviews, Oct. 20, 2009, pp. 1-2.

Bitar, Roger, "Deploying Hybrid Storage Pools with Sun Flash Technology and the Solaris ZFS File System", Retrieved at <<http://www.absol.co.za/medialib/Downloads/Home/AboutUs/News/DEPLOYING%20HYBRID%20STORAGE%20POOLS.pdf>>, Oct. 31, 2008, pp. 15.

Koltsidas, et al., "Flashing up the Storage Layer", Retrieved at http://homepages.inf.ed.ac.uk/s0679010/mfdb.pdf>>, VLDB '08, Aug. 24-30, 2008, pp. 12.

Leung, et al., "Measurement and Analysis of Large-Scale Network File System Workloads", Retrieved at http://www.ssrc.ucsc.edu/Papers/leung-usenix08.pdf>>, Proceedings of the 2008 USENIX Annual Technical Conference, Jun. 22-27, 2008, pp. 14.

Payer, et al., "Combo Drive: Optimizing Cost and Performance in a Heterogeneous Storage Device", Retrieved at <<http://cs.uni-salzburg.at/~ck/publications/conferences/WISH09-ComboDrive.pdf>>, Mar. 7, 2009, pp. 1-8.

Rosenblum, et al., "The Design and Implementation of a Log-Structured File System", Retrieved at <<http://www.cs.berkeley.edu/~brewer/cs262/LFS.pdf>>, Proceedings of the 13th ACM Symposium on Operating Systems Principles and the Feb. 1992 ACM Transactions on Computer Systems, Feb. 1992, pp. 1-15.

Soundararajan, Gokul, et al., "Extending SSD Lifetimes with Disk-Based Write Caches", Proceedings of FAST '10: 8th USENIX Conference on File and Storage Technologies, Feb. 23, 2010, pp. 101-114.

Supplementary European Search Report, dated Nov. 7, 2012, received in connection with corresponding European Patent Application No. 10836480.3.

\* cited by examiner

EXTENDING SSD LIFETIME USING HYBRID STORAGE

BACKGROUND

Solid state drives (SSDs) are becoming a popular alternative to conventional hard disk drives. SSDs differ from conventional hard disk drives in several ways. For example, SSDs have semiconductor properties, have no moving parts, and have inherent parallelism.

Even though SSDs have the potential to replace hard disk drives, a major barrier to the adoption of SSDs is their limited lifetime. SSDs are built using NAND flash memory, which limits the number of write operations that can be issued to a flash memory block. A memory block must be erased before each overwrite and such erasures decrease the lifetime of the SSD. Additionally, as the cost of NAND flash memory has declined with increased bit density, the number of erase cycles (and hence write operations) that a flash memory can tolerate has suffered.

Moreover, general purpose operating system workloads are hard on the storage subsystem, particularly in terms of write volume and non-sequentiality. The combination of a more stressful workload and fewer available erase cycles reduces useful lifetime of SSDs, in some cases to less than one year.

SUMMARY

A hybrid storage device uses a write cache such as a hard disk drive, for example, to cache data to a solid state drive (SSD). Data is logged sequentially to the write cache and later migrated to the SSD. The SSD is a primary storage that stores data permanently. The write cache is a persistent durable cache that may store data of disk write operations temporarily in a log structured fashion.

In an implementation, full caching is used, in which the write cache caches the data of each write operation that is issued to the logical address space. Alternately, selective caching may be used. With selective caching, only some of data (e.g., that associated with the most overwritten memory blocks of the SSD) are cached in the write cache.

In an implementation, a migration policy may be used to determine how long to cache the data in the write cache before migrating the data to the SSD. The migration policy may be implemented using one or more migration triggers that cause the contents of the write cache to be flushed to the SSD. Migration triggers may include a timeout trigger, a read threshold trigger, and a migration size trigger, for example.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
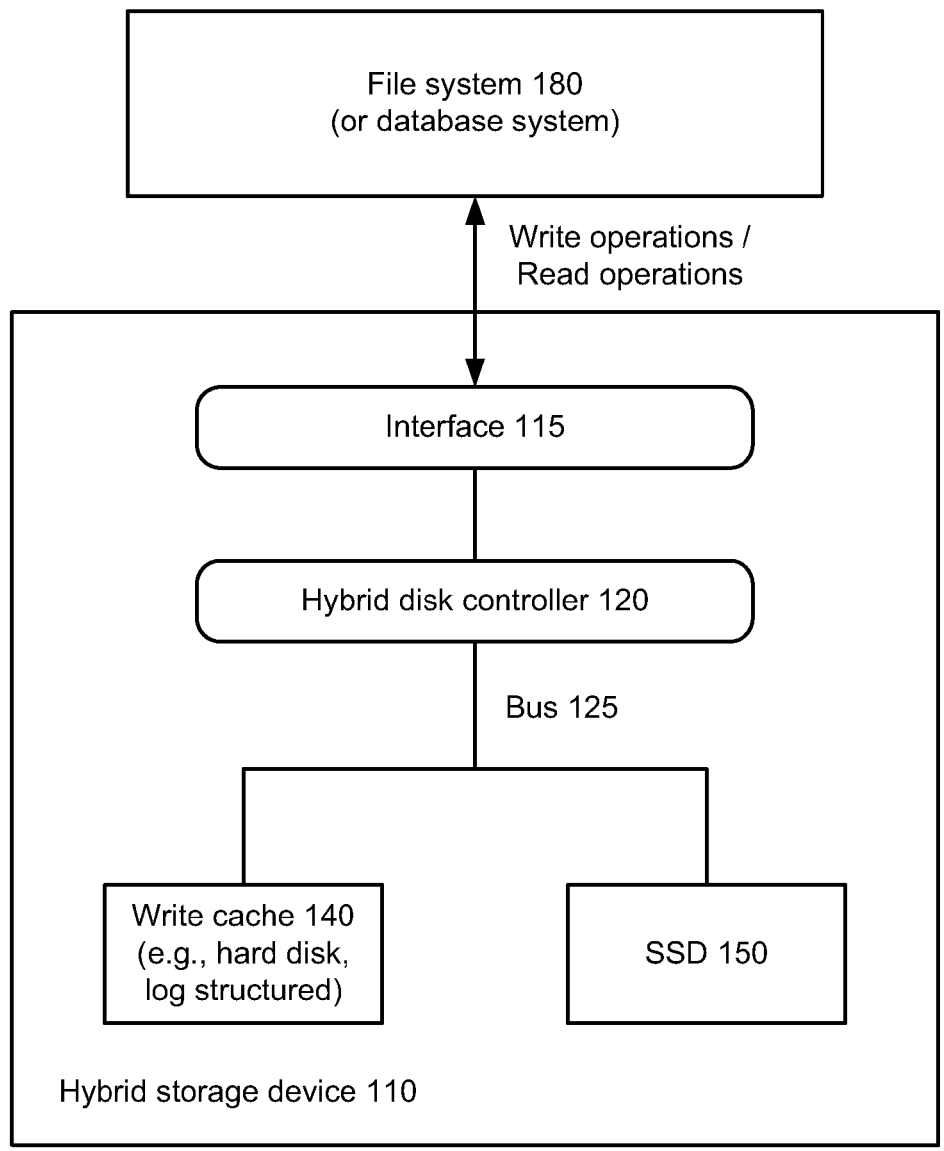
FIG. 1 illustrates an exemplary hybrid storage environment.

FIG. 1 illustrates an exemplary hybrid storage environment 100 comprising a hybrid storage device 110 and a file system 180. The hybrid storage device 110 uses a write cache 140 such as a hard disk drive (HDD), for example, to cache data of write operations to a solid state drive (SSD) 150 such as an MLC (multi level cell) based SSD. As described further herein, data of write operations is logged sequentially to the write cache 140 and later migrated to the SSD 150. Read operations are usually served from the SSD 150 and occasionally from the slower write cache 140. The hybrid storage device 110, or aspects thereof, may be implemented using one or more computing devices such as the computing device 600 illustrated in FIG. 6.

The hybrid storage device 110 comprises the write cache 140 and the SSD 150. The SSD 150 is a primary storage that stores data permanently. Although an SSD is shown in FIG. 1, any type of flash chip or other non-volatile memory device known in the art may be used as storage in place of the SSD 150. The write cache 140 is a persistent durable cache that may store data of disk write operations temporarily in a log structured fashion (e.g., the write cache 140 is a log structured write cache). In an implementation, the write cache 140 may comprise durable storage, such as a hard disk (also referred to as an HDD) or other forms of solid state memory (e.g., SLC (single level cell) chips) and may store only data of disk write operations. The write cache 140 may be slower than the SSD 150 and may be larger (e.g., have more storage space) than the SSD 150. Because the SSD 150 is faster than the write cache 140, most of the read operations are sent to the SSD 150 in an implementation.

Data may be saved in the write cache 140 in accordance with a caching policy, such as full caching or selective caching. With full caching, all data is cached, whereas with selective caching, only certain data, such as the most written data, is cached in the write cache 140. At some point, the cached data may be moved from the write cache 140 to the SSD 150 in accordance with a migration policy. In some implementations, the data may be moved (i.e., migrated) periodically (e.g., every 15 seconds, 30 seconds, one minute, etc., from the write cache 140 to the SSD 150), whenever the amount of data in the write cache 140 exceeds a predetermined amount, and/or when certain data gets stored in the write cache 140. There is no limit to the number of SSDs that may be supported by the write cache 140. Thus, for example, a single HDD may serve as a write cache for multiple SSDs. Although only one SSD 150 is shown in FIG. 1, multiple SSDs may be comprised within the hybrid storage device 110, and the write cache 140 may cache data for each of the multiple SSDs. Moreover, there is no limit to the number of devices in the write cache 140. For example, several HDDs may be comprised within the write cache 140.

It is noted that in SSD-terminology, a block is a collection of pages (e.g., a set of 64 4 KB pages will form a 256 KB block). However, as used herein, a block is a unit of read or write and is not a flash-specific block. Thus, if a block is read or written as used herein, a read or write is performed to a sector or a page, for example, in the SSD 150 rather than the SSD block. Caching data, such as data for particular memory blocks, temporarily in the write cache 140 reduces the overall number of writes of data to the primary storage SSD 150 without significantly impacting the read performance of the SSD. For example, by caching the data of the write operations for a longer time, multiple overwrites to the same memory block of the SSD 150 during migration may be avoided and erase cycles may be conserved. An overwrite is a repeated write to the same logical sector of a memory. Reducing the number of writes of data to the SSD 150 may extend the lifetime of the SSD 150, in some cases by more than 100 percent.

Figure 2:
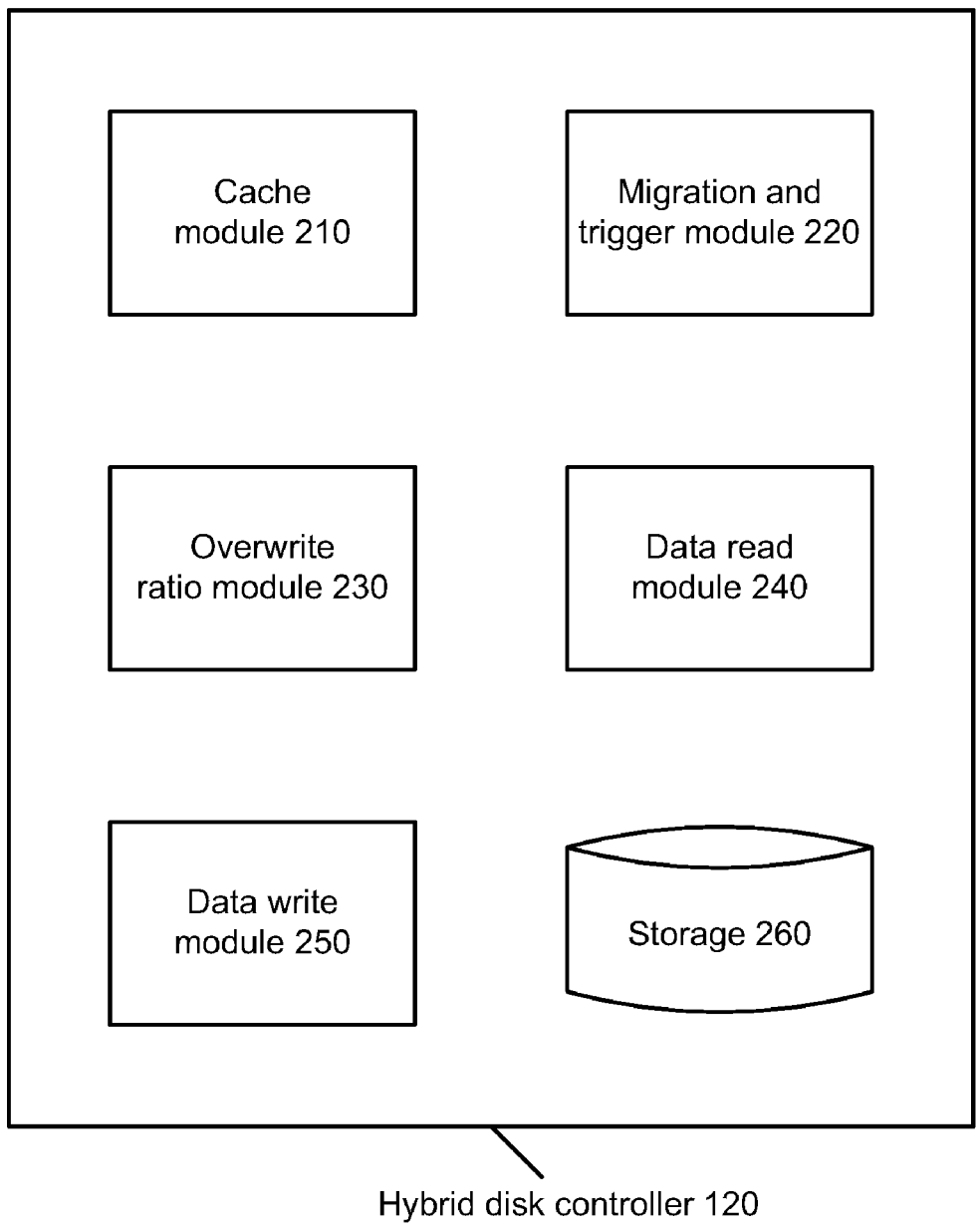
FIG. 2 is a block diagram of an implementation of a hybrid disk controller that may be used for hybrid storage.

The hybrid storage device 110 may further comprise a hybrid disk controller 120 communicatively coupled to the write cache 140 and the SSD 150 through a bus 125. A block diagram of an implementation of the hybrid disk controller 120 is shown in FIG. 2. The hybrid disk controller 120 may be operable to perform block-specific operations (e.g., read page, write page, erase block, etc.) or object-specific operations (e.g., create object, delete object, read object, write object, etc.) through the bus 125. Any block-specific or object-specific operations may be supported by the hybrid disk controller 120. The hybrid disk controller 120 may further be operable to perform data reads (e.g., via a data read module 240), data writes (e.g. via a data write module 250), and data migration (e.g., via a migration and trigger module 220) as described herein.

The write cache 140 and the SSD 150 may be exposed to a file system 180 through an interface such as the interface 115 of the hybrid disk controller 120. The file system 180 may then send data read and write requests to the hybrid storage device 110 and the requests may be fulfilled by the hybrid disk controller 120 from the write cache 140 or the SSD 150. While only one write cache 140 and one SSD 150 are shown, it is for illustrative purposes only. There is no limit to the number of caches, buffers, memories, storage devices, and the like that can be supported.

Many of the write operations are overwrites of a small set of memory blocks. The write cache 140 may coalesce the overwrites, thereby reducing the write traffic to the SSD 150. In an implementation, the file system 180 comprises a cache that may serve any immediate read operations without accessing the hybrid storage device 110. Thus, the hybrid storage device 110 has a period of time within which to coalesce overwrites on the write cache 140, during which few reads occur.

In an implementation, the data of write operations are appended to a log stored on the write cache 140 and eventually migrated to the SSD 150, preferably before subsequent reads. Structuring the write cache 140 as a log allows the write cache 140 to operate at its fast sequential write mode. In addition to coalescing overwrites, the write cache 140 also increases the sequentiality of the workload observed by the SSD 150. This results in increased write lifetime, which is the total number of write operations that can be issued to the hybrid storage device 110 over its lifetime. The write lifetime is increased without substantially altering the reliability characteristics of the SSD 150. While the write cache 140 represents an additional point of failure, any such event leaves the file system intact on the SSD 150 and only results in the loss of recent data.

Figure 3:
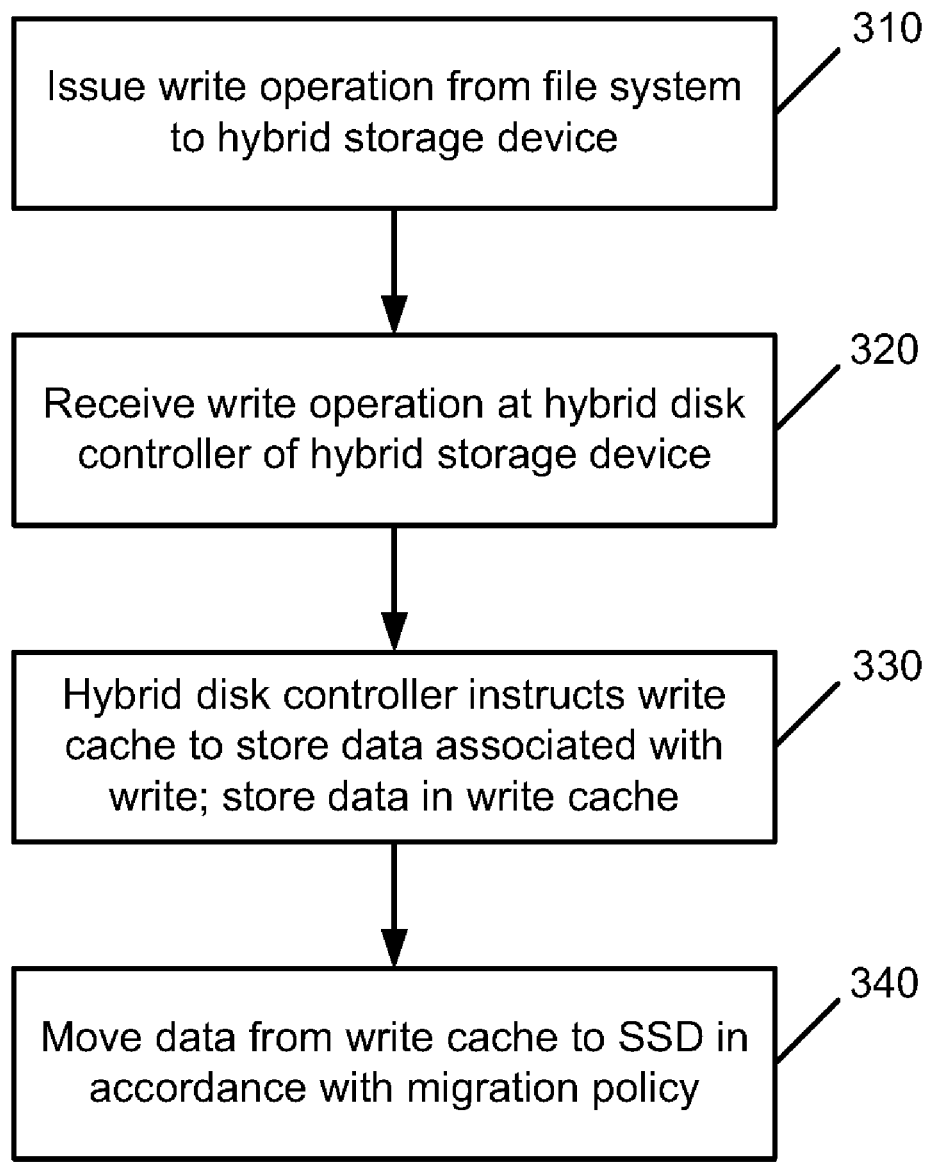
FIG. 3 is an operational flow of an implementation of a method of hybrid storage using full caching.

In an implementation, full caching is used, in which the write cache 140 caches the data of every write that is issued to the logical address space. FIG. 3 is an operational flow of an implementation of a method 300 of hybrid storage using full caching. The method 300 may be implemented by the hybrid storage device 110, for example.

At 310, a write operation is issued from the file system 180 to the hybrid storage device 110. The write operation is received at the hybrid disk controller 120 via the interface 115, at 320. At 330, the hybrid disk controller 120 instructs the write cache 140 (e.g., via the cache module 210) to store the data associated with the write, and the data is stored in the write cache 140. At some point, at 340, in accordance with a migration policy and the migration and trigger module 220, described further herein, the data is moved from the write cache 140 to the SSD 150.

Figure 4:
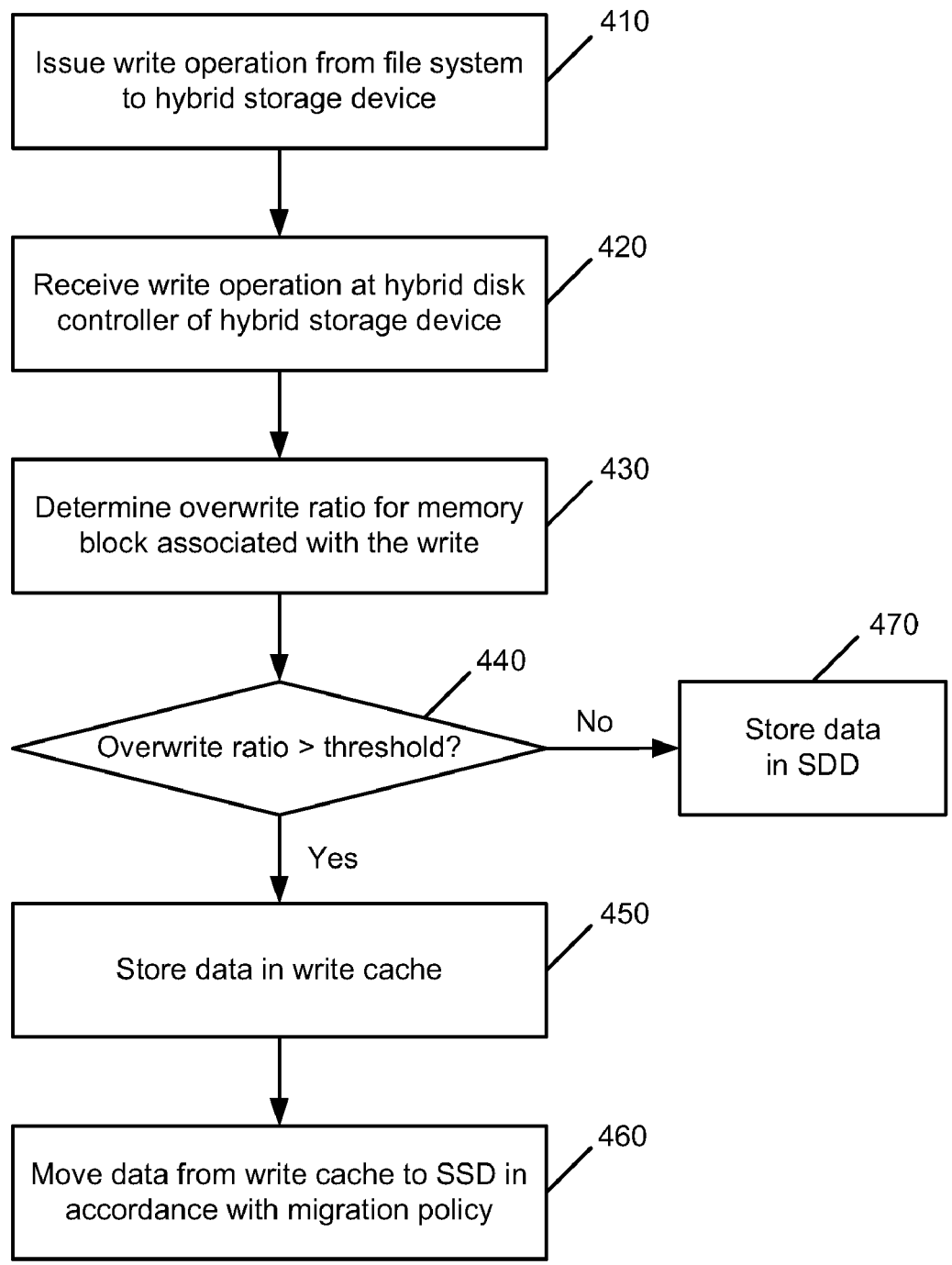
FIG. 4 is an operational flow of an implementation of a method of hybrid storage using selective caching.

Instead of full caching of data associated with every write that is issued to the logical address space, selective caching may be used and implemented by the cache module 210. With selective caching, only data associated with the most overwritten memory blocks of the SSD 150 are cached in the write cache 140. FIG. 4 is an operational flow of an implementation of a method 400 of hybrid storage using selective caching. The method 400 may be implemented by the hybrid storage device 110, for example.

At 410, a write operation is issued from the file system 180 to the hybrid storage device 110. The write operation is received at the hybrid disk controller 120 via the interface 115, at 420. At 430, an overwrite ratio module 230 of the hybrid disk controller 120 determines an overwrite ratio for the memory block associated with the write. The overwrite ratio is the ratio of the number of overwrites to the number of writes that the block receives. The overwrite ratio may be stored in storage of the hybrid disk controller 120, such as in storage 260.

At 440, the overwrite ratio of the memory block may be compared to a predetermined value referred to as an overwrite threshold (which may be retrieved from storage, such as storage 260). If the overwrite ratio of the block exceeds the overwrite threshold as determined at 440, then the data of the write operation (associated with the memory block) is written to the write cache 140 at 450 (e.g., depending on the implementation, the data write module 250 and/or the cache module 210 of hybrid disk controller 120 instructs the write cache 140 to store the data associated with the write and the data is stored in the write cache 140). At some point, at 460, in accordance with a migration policy, described further herein, the data may be moved from the write cache 140 to the SSD 150 using the migration and trigger module 220.

However, if the overwrite ratio of the block does not exceed the overwrite threshold as determined at 440, then the data is written to the SDD 150 at 470 (e.g., the hybrid disk controller 120 instructs the SDD 150 to store the data associated with the write and the data is stored in the SDD 150).

The overwrite threshold may be set by a user or an administrator, for example, and stored in the storage 260. The overwrite threshold may be subsequently changed by the user or the administrator, for example. As the overwrite threshold is increased, only the data of those memory blocks which have a higher overwrite ratio, as a result of being frequently overwritten, are cached in the write cache 140. In an implementation, full caching may be enabled by setting the overwrite threshold to zero. Although an overwrite ratio may be used in a determination of frequently written blocks, any technique may be used for determining the frequently written blocks.

A read penalty may be defined as the percentage of total reads serviced by the write cache 140. For example, if the hybrid storage device 110 receives 50 M reads and the write cache 140 receives 1 M of these reads, the read penalty is two percent. Ideally, the read penalty is kept as low as possible.

Selective caching may lower a read penalty and reduce the amount of data migrated. However, selective caching has overhead as the hybrid storage device 110 may compute and store per-block overwrite ratios in storage 260. Additionally, selective caching may complicate recovery from failure.

As noted above, data is cached in the write cache 140 before it is migrated to the SSD 150. A migration policy may be used to determine how long to cache the data in the write cache 140 before migrating the data to the SDD 150. In an implementation, the time is long enough to capture a substantial number of overwrites but not long enough to receive a substantial number of reads to the write cache 140. WAW (write-after-write) may be defined as the time interval between two consecutive writes to a memory block before an intervening read to the same block, and RAW (read-after-write) may be defined as the time interval between a write and a subsequent read to the same memory block. In an implementation, the time for caching data of memory blocks prior to migration is long enough to capture a number of overwrites higher than a predetermined number or fraction of WAW intervals, while receiving a number of reads to the write cache 140 lower than a predetermined number or fraction of RAW intervals.

A policy on how long to cache data may be determined by per-block time values, but this may be expensive to maintain and enforce. Alternately, a migration policy may be implemented using one or more migration triggers that causes the contents of the write cache 140 to be flushed to the SSD 150. Migration triggers may include a timeout trigger, a read threshold trigger, and a migration size trigger, for example. Triggers and migration policies may be maintained and monitored by the migration and trigger module 220 of the hybrid disk controller 120, for example. In an implementation, the triggers and migration policies may be set or updated by a user or an administrator.

A timeout trigger is a trigger that fires if a predetermined amount of time elapses without a migration. Such a trigger is predictable and bounds the recentness of data that may be lost due to failure of the write cache 140. For example, a timeout value of five minutes will ensure that no data of a write operation older than five minutes will be lost. However, since a timeout trigger does not react to the workload, certain workloads can incur high read penalties.

A read threshold trigger fires when the measured read penalty since the last migration goes beyond a threshold. Such an approach allows the read penalty to be bounded. If used in isolation, however, the read penalty trigger may be subject to a scenario, for example, in which if data is never read from the hybrid storage device 110, the measured read penalty will stay at zero and the data will never be moved from the write cache 140 to the SDD 150. This can result in the write cache 140 running out of space, and also leave the system more vulnerable to data loss on the failure of the write cache 140.

A migration size trigger fires when the total size of migratable data exceeds a size threshold. This may bound the quantity of data that may be lost on failure of the write cache 140. Used alone or in combination, the triggers can enable complex migration policies. For example, a policy could state that the read penalty should not be more than five percent, and that no more than 100 MB or five minutes worth of data should be lost if the write cache 140 were to fail.

Figure 5:
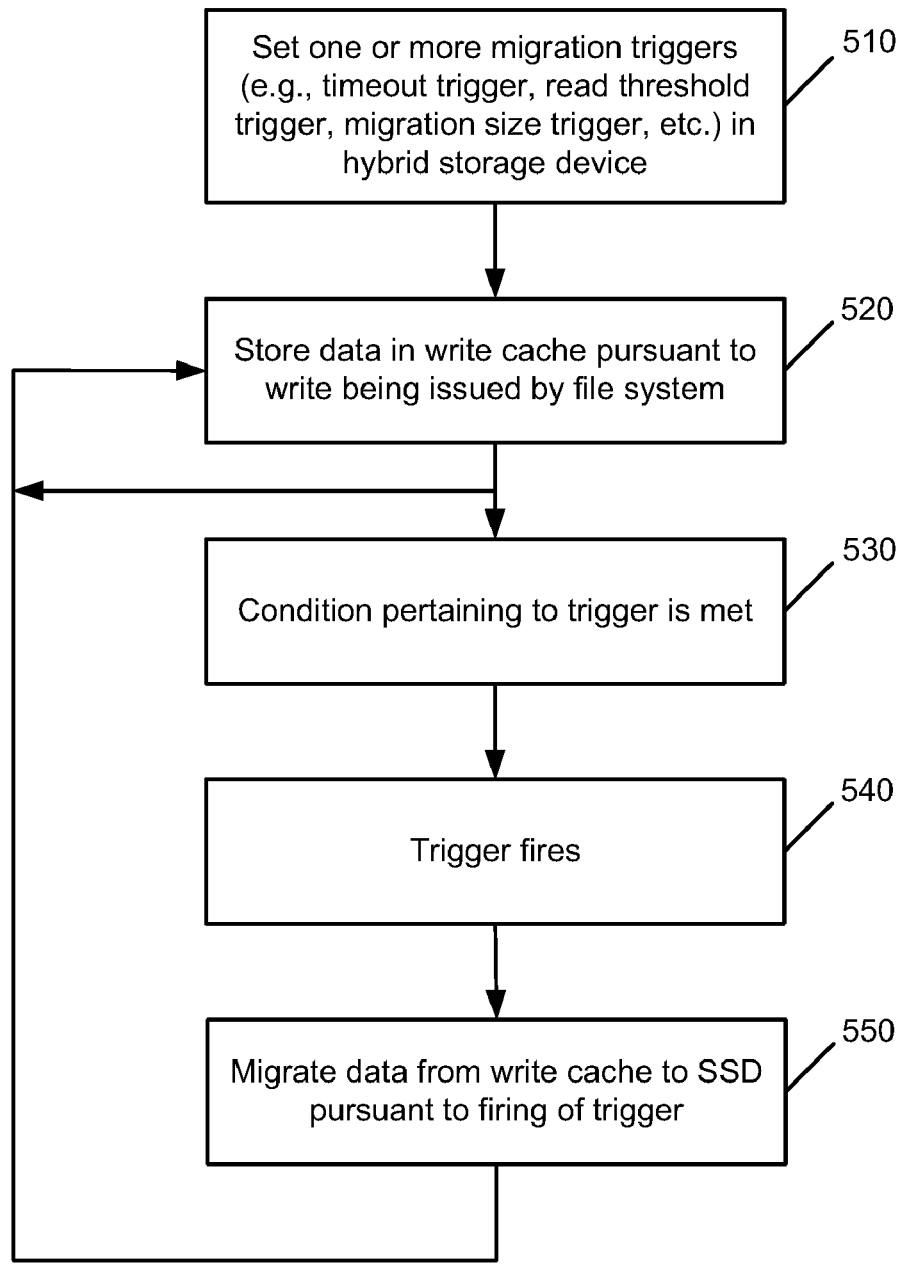
FIG. 5 is an operational flow of an implementation of a method of hybrid storage using a migration policy.

FIG. 5 is an operational flow of an implementation of a method 500 of hybrid storage using a migration policy. The method 500 may be implemented by the hybrid storage device 110, for example. At 510, one or more migration triggers may be set in the hybrid storage device 110, e.g., a timeout trigger, a read threshold trigger, and/or a migration size trigger may be set by the migration and trigger module 220 of the hybrid disk controller 120. At 520, data may be stored in the write cache 140, e.g., pursuant to a write being issued from the file system 180 to the hybrid storage device 110. The data may be written to the write cache 140 in accordance with a full caching policy or a selective caching policy, depending on the implementation. In an implementation, additional data may be written to the write cache 140 over time.

At some point, at 530, the conditions pertaining to a trigger may be met, and the trigger may fire at 540 in response. At 550, pursuant to the firing of the trigger, the data may be migrated from the write cache 140 to the SDD 150. The hybrid disk controller 120 may react to the firing of the trigger by moving the appropriate data associated with the trigger from the write cache 140 to the SSD 150. Processing may continue at 520.

The data migration is quick and straightforward. In an implementation, data is read sequentially from the write cache log and written to the SSD 150. Since the log of the write cache 140 and the file system 180 are on different devices, this process does not suffer from the performance drawbacks of conventional cleaning mechanisms in conventional log structured file systems where shuttling between the log and the file system on the same device can cause random seeks.

In an implementation, the hybrid storage may be implemented at the file system level instead of the block device level. A file system can leverage knowledge of the semantic relationships between memory blocks to exploit the spatial locality of the blocks. Additionally, hybrid storage may be implemented by modifying existing journaling file systems to store the update journal on the write cache 140 and the actual data on the SSD 150.

A file system design also provides access to information which can enable it to approach the performance of an idealized write cache. An idealized cache uses an oracle that notifies it of impending reads to blocks just before they occur, so dirty data can be migrated in time to avoid reads from the write cache. At the block level, such an oracle does not exist and migration policies are used. However, at the file system level, evictions of blocks from the buffer cache of the file system can be used to signal impending reads. As long as the file system stores a block in its buffer cache, it will not issue reads for that block to the hybrid storage device. Once it evicts the block, any subsequent read is serviced from the hybrid storage device. Accordingly, a policy of migrating blocks from the write cache to the SSD upon eviction from the buffer cache will result in the maximum write savings with no read penalty.

Figure 6:
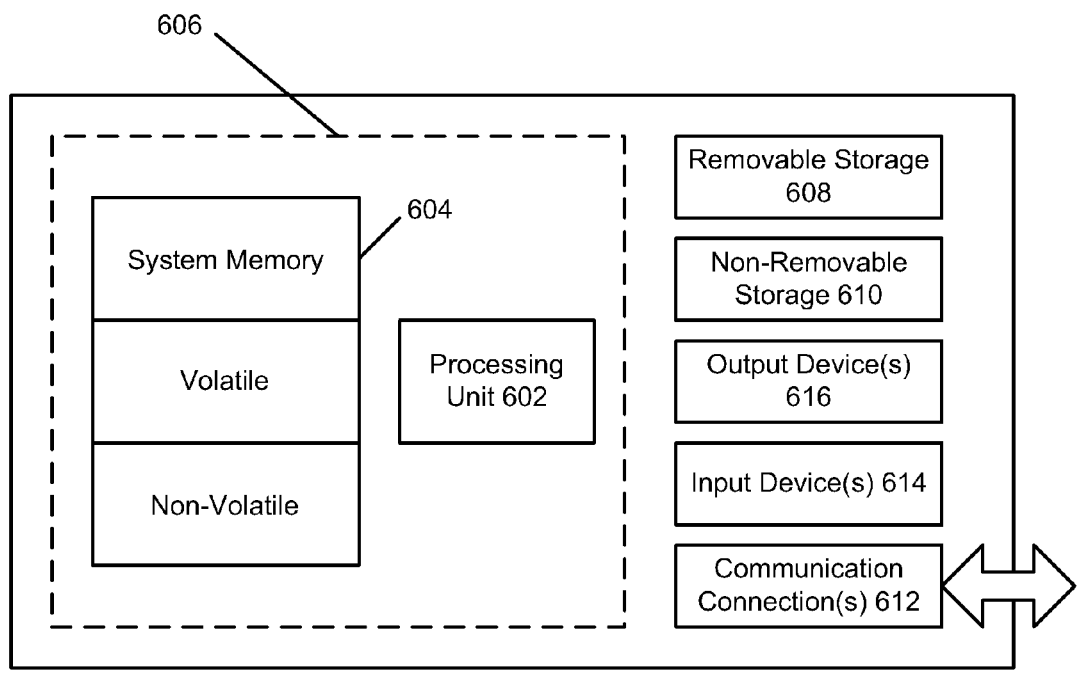
FIG. 6 is an illustration of an exemplary computing environment.

FIG. 6 is an illustration of an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other volatile or non-volatile memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A storage method, comprising:
   receiving a write operation at a hybrid storage device comprising a write cache and a solid state drive;
   determining a caching policy for data associated with the write operation by a hybrid disk controller of the hybrid storage device;
   storing the data in the write cache or in the solid state drive based on the caching policy, wherein the write cache includes at least some stored data from one or more additional write operations; and
   migrating all stored data from the write cache to the solid state drive based on a migration policy, wherein the migration policy is based on a timeout trigger that fires if a predetermined amount of time elapses since a previous migration of all stored data from the write cache, and wherein the migration policy is further based on a read threshold trigger that fires when a read penalty exceeds a threshold.

2. The method of claim 1, wherein the write cache comprises a hard disk drive.

3. The method of claim 1, wherein the caching policy is full caching of the data in the write cache.

4. The method of claim 1, wherein the caching policy is selective caching of the data, and further comprising:
   determining an overwrite ratio for a memory block of the solid state drive, the memory block being associated with the data associated with the write operation;
   comparing the overwrite ratio to a threshold; and
   storing the data in the write cache if the overwrite ratio is greater than the threshold and otherwise storing the data in the solid state drive.

5. The method of claim 4, wherein the overwrite ratio is the ratio of the number of overwrites that the memory block receives to the number of writes that the memory block receives.

6. The method of claim 1, wherein the write operation is received at the hybrid storage device from a file system.

7. The method of claim 1, wherein the migration policy is further based on a migration size trigger.

8. The method of claim 1, further comprising:
   receiving a read operation at the hybrid storage device; and
   reading requested data for the read operation from the solid state drive.

9. A storage method, comprising:
   receiving, by a hybrid storage device from a file system, a plurality of write operations, wherein the hybrid storage device comprises a log structured write cache and a solid state drive;
   storing, by a hybrid disk controller of the hybrid storage device, the data of one of the write operations in the write cache based on a caching policy;
   storing, by the hybrid disk controller, the data of another of the write operations in the solid state drive based on the caching policy; and
   migrating, by the hybrid disk controller, all of the data from the write cache to the solid state drive based on a migration policy, wherein the migration policy is based on a timeout trigger that fires if a predetermined amount of time elapses since a previous migration of all data from the write cache, wherein the migration policy is further based on a read threshold trigger that fires when a read penalty exceeds a threshold, and wherein migrating the data is performed pursuant to a firing of either the timeout trigger or the read threshold trigger.

10. The method of claim 9, further comprising determining which of the data to store in the write cache and which of the data to store in the solid state drive by comparing an overwrite ratio to a threshold.

11. The method of claim 9, wherein the migration policy is further based on a migration size trigger that fires when the size of the data to be migrated exceeds a size threshold, wherein migrating the data is further performed pursuant to a firing of the migration size trigger.

12. The method of claim 9, further comprising:
   receiving an additional write operation at the hybrid storage device after migrating the data from the write cache to the solid state drive;
   storing additional data of the additional write operation in the write cache based on the caching policy; and
   migrating the stored additional data in the write cache to the solid state drive based on the migration policy.

13. A storage device, comprising:
   a write cache;
   a solid state drive; and
   a hybrid disk controller adapted to receive a write operation, determine a caching policy for data associated with the write operation, store the data in the write cache or in the solid state drive based on the caching policy, wherein the write cache includes at least some stored data from one or more additional write operations, and migrate all data stored in the write cache to the solid state drive in accordance with a migration policy, wherein the migration policy is based on a timeout trigger that fires if a predetermined amount of time elapses since a previous migration of all stored data from the write cache, and wherein the migration policy is further based on a read threshold trigger that fires when a read penalty exceeds a threshold.

14. The device of claim 13, wherein the write cache comprises a log structured hard drive.

15. The device of claim 13, wherein the migration policy is further based on a migration size trigger.

16. The device of claim 13, wherein the caching policy is one of full caching of the data in the write cache or selective caching of the data, wherein the selective caching is based on an overwrite ratio that is the ratio of the number of overwrites that a memory block receives to the number of writes that the memory block receives.

* * * * *